United States Patent
Rogers et al.

(10) Patent No.: US 9,127,974 B2
(45) Date of Patent: Sep. 8, 2015

(54) MAGNETIC FLOWMETER ASSEMBLY FRAMEWORK

(71) Applicant: Rosemount Inc., Chanhassen, MN (US)

(72) Inventors: Steven B. Rogers, Minnetonka, MN (US); Nelson Mauricio Morales, Lakeville, MN (US)

(73) Assignee: Rosemount Inc., Bloomington, MN (US)

( * ) Notice: Subject to any disclaimer, the term of this patent is extended or adjusted under 35 U.S.C. 154(b) by 231 days.

(21) Appl. No.: 13/791,995

(22) Filed: Mar. 9, 2013

(65) Prior Publication Data
US 2014/0251025 A1    Sep. 11, 2014

(51) Int. Cl.
*G01F 1/58*    (2006.01)

(52) U.S. Cl.
CPC ............... *G01F 1/584* (2013.01); *G01F 1/588* (2013.01); *Y10T 29/49117* (2015.01)

(58) Field of Classification Search
CPC .............. G01F 1/58; G01F 1/60; G01F 1/588
USPC ........................................ 73/861.11, 861.12
See application file for complete search history.

(56) References Cited

U.S. PATENT DOCUMENTS

| | | | |
|---|---|---|---|
| 4,679,442 A * | 7/1987 | Kubota | 73/861.12 |
| 4,715,233 A * | 12/1987 | Neven et al. | 73/861.12 |
| 2006/0174716 A1 | 8/2006 | Zajac et al. | |
| 2006/0185442 A1 * | 8/2006 | Keese et al. | 73/861.12 |
| 2009/0025486 A1 * | 1/2009 | Cros et al. | 73/861.12 |
| 2009/0188327 A1 | 7/2009 | Shanahan et al. | |
| 2010/0024568 A1 | 2/2010 | Diederichs | |
| 2011/0079089 A1 | 4/2011 | Rogers | |
| 2014/0083200 A1 * | 3/2014 | Rogers et al. | 73/861.12 |
| 2014/0090483 A1 * | 4/2014 | Smith et al. | 73/861.11 |

FOREIGN PATENT DOCUMENTS

| | | |
|---|---|---|
| JP | 08271304 A | 10/1996 |
| JP | 2004061453 A | 2/2004 |

OTHER PUBLICATIONS

International Searching Authority Patent Cooperation Treaty, International Search Report and Written Opinion, Jun. 26, 2014, 17 pages.

* cited by examiner

*Primary Examiner* — Jewel V Thompson
(74) *Attorney, Agent, or Firm* — Kinney & Lange, P.A.

(57) ABSTRACT

A magnetic flowmeter includes a pipe section, coils for generating a magnetic field across the pipe section, and electrodes for sensing EMF induced by process fluid flow through the magnetic field. An assembly framework is mounted on the pipe. The coils, electrodes, and associated wiring of the flowmeter are located and secured in place by the framework.

19 Claims, 18 Drawing Sheets

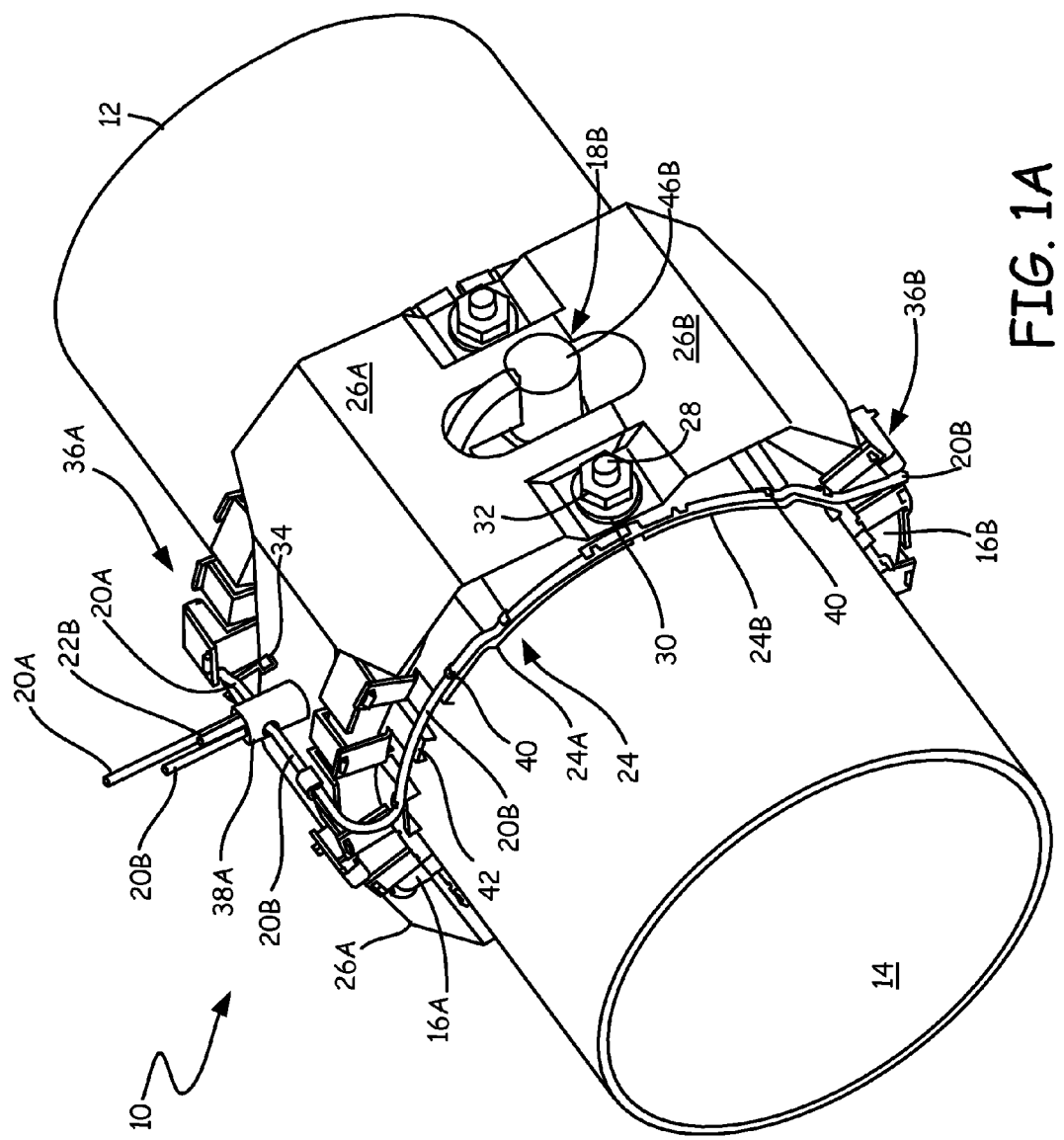

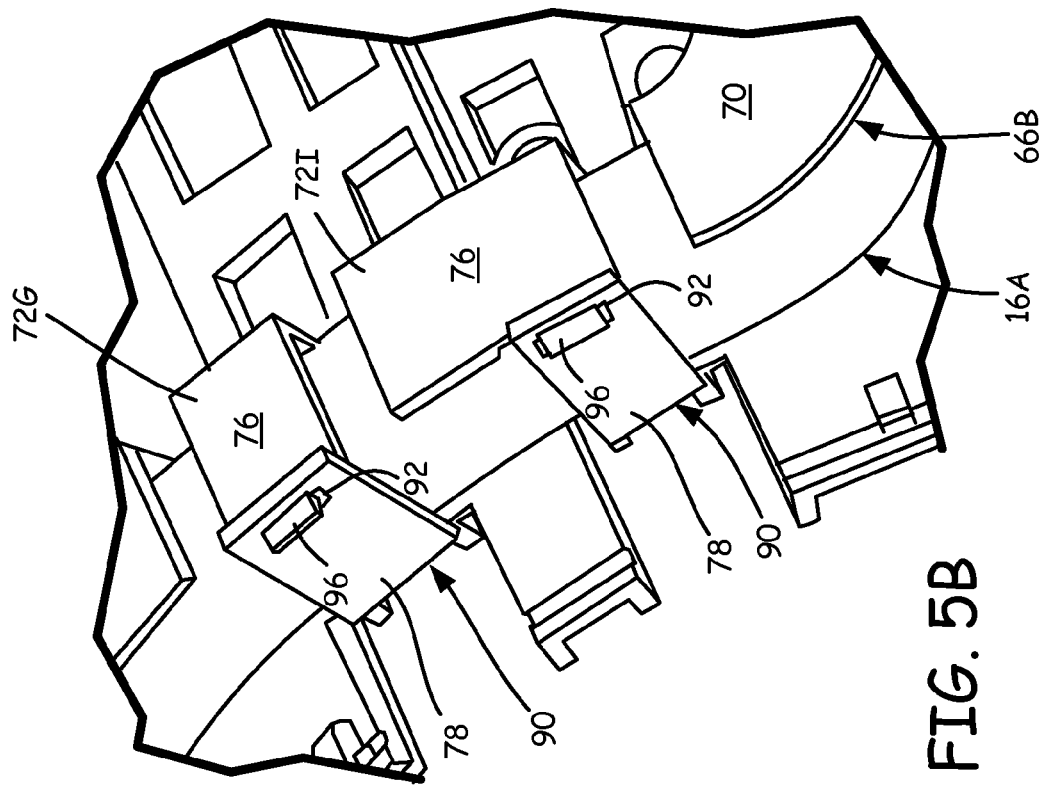
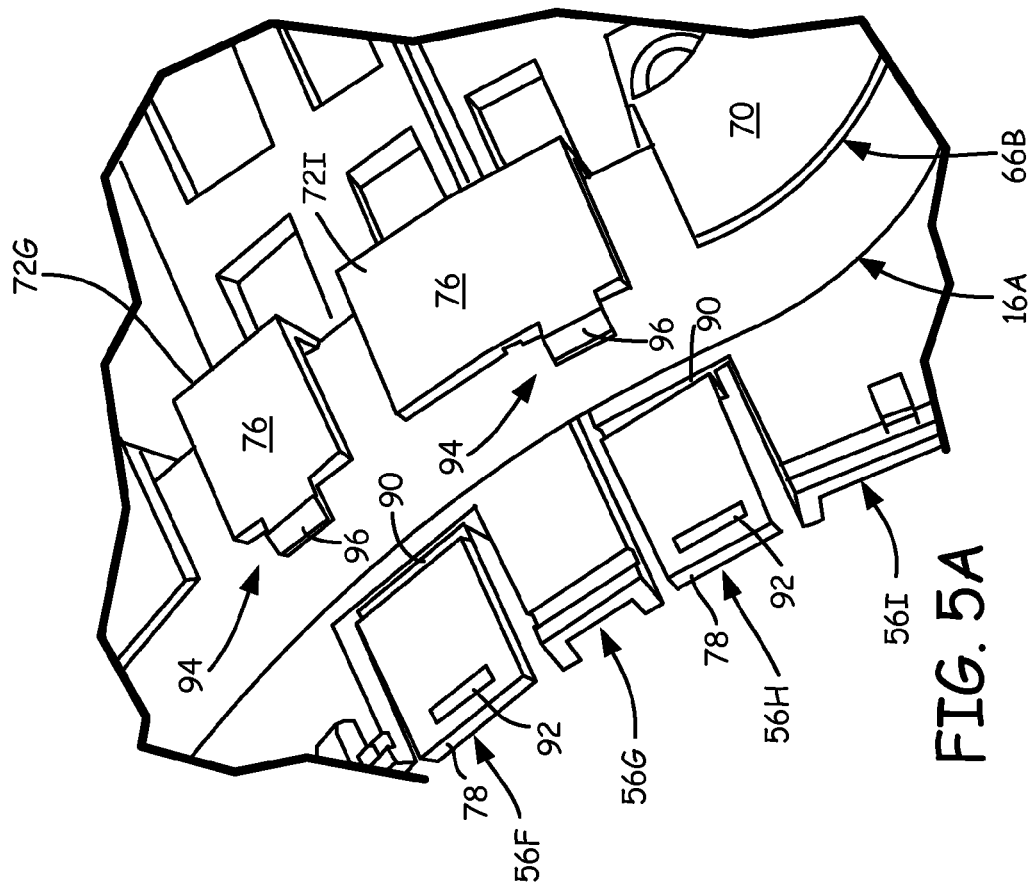

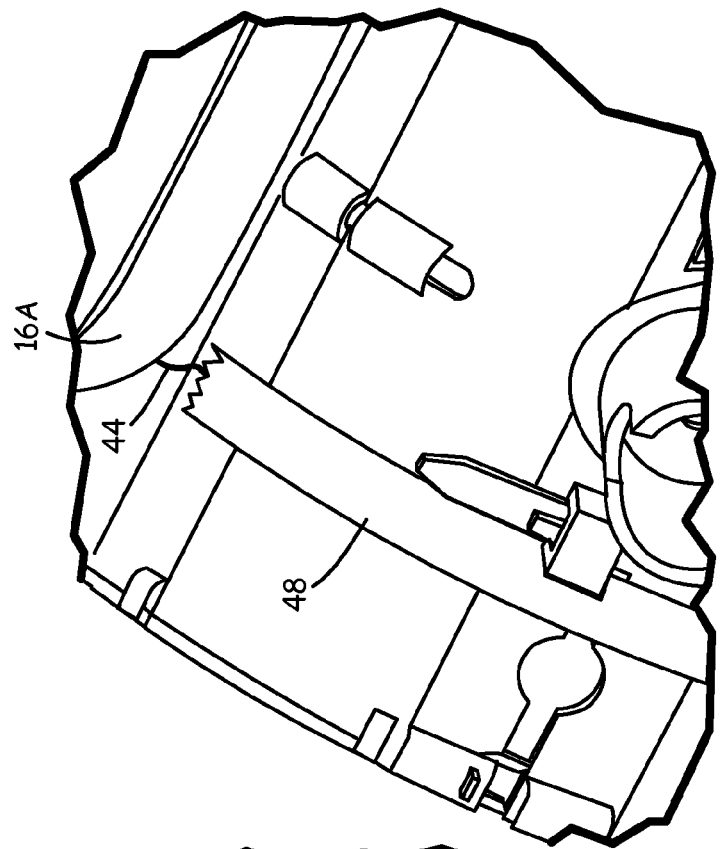
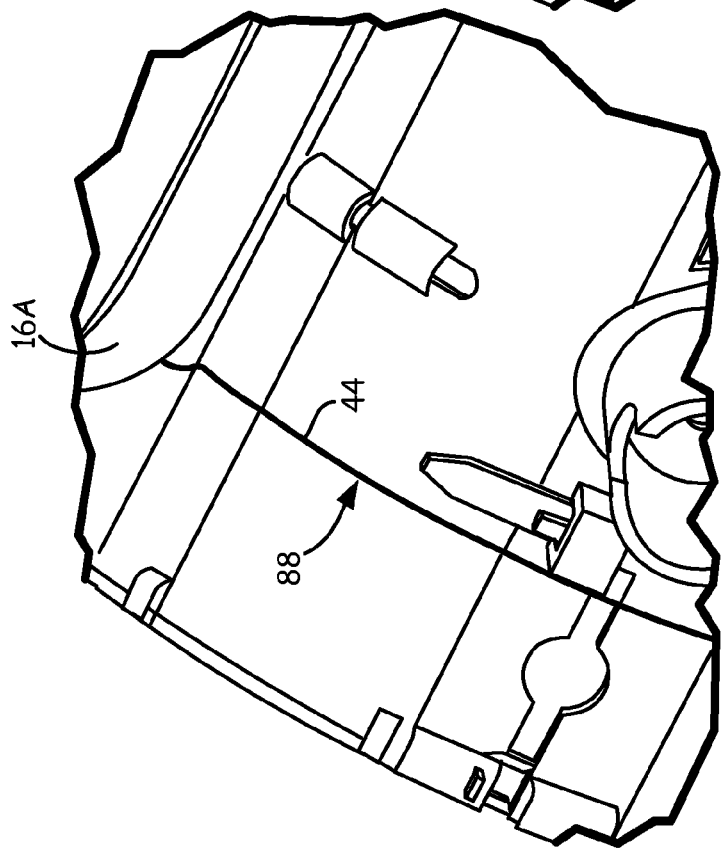

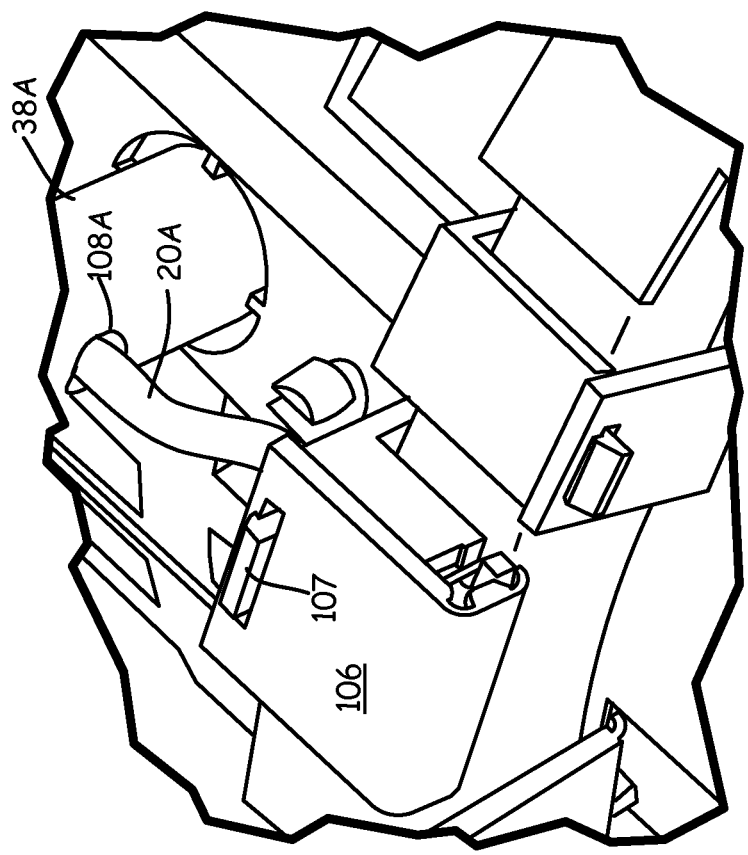
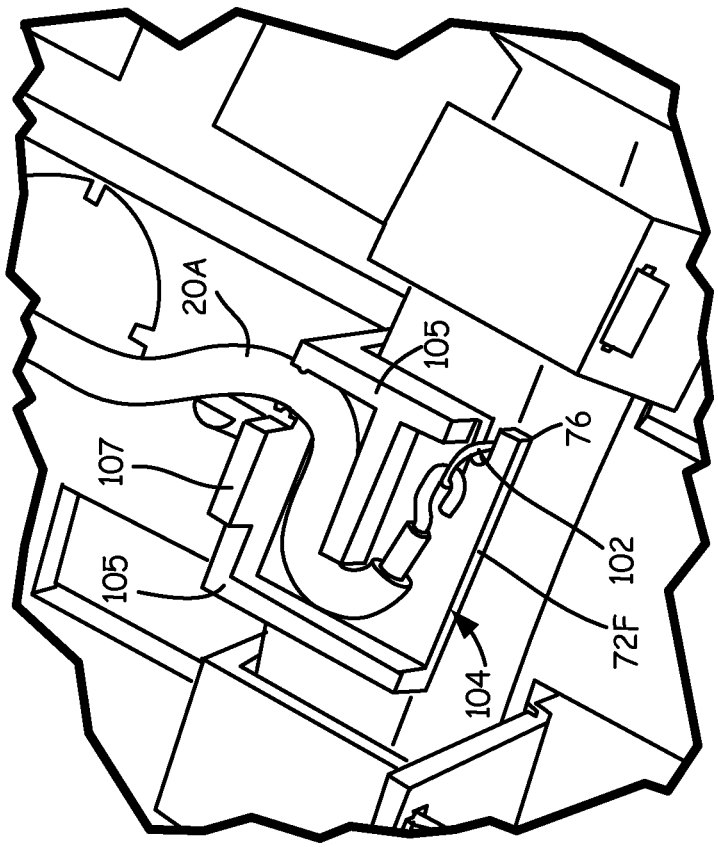
FIG. 7A
FIG. 7B

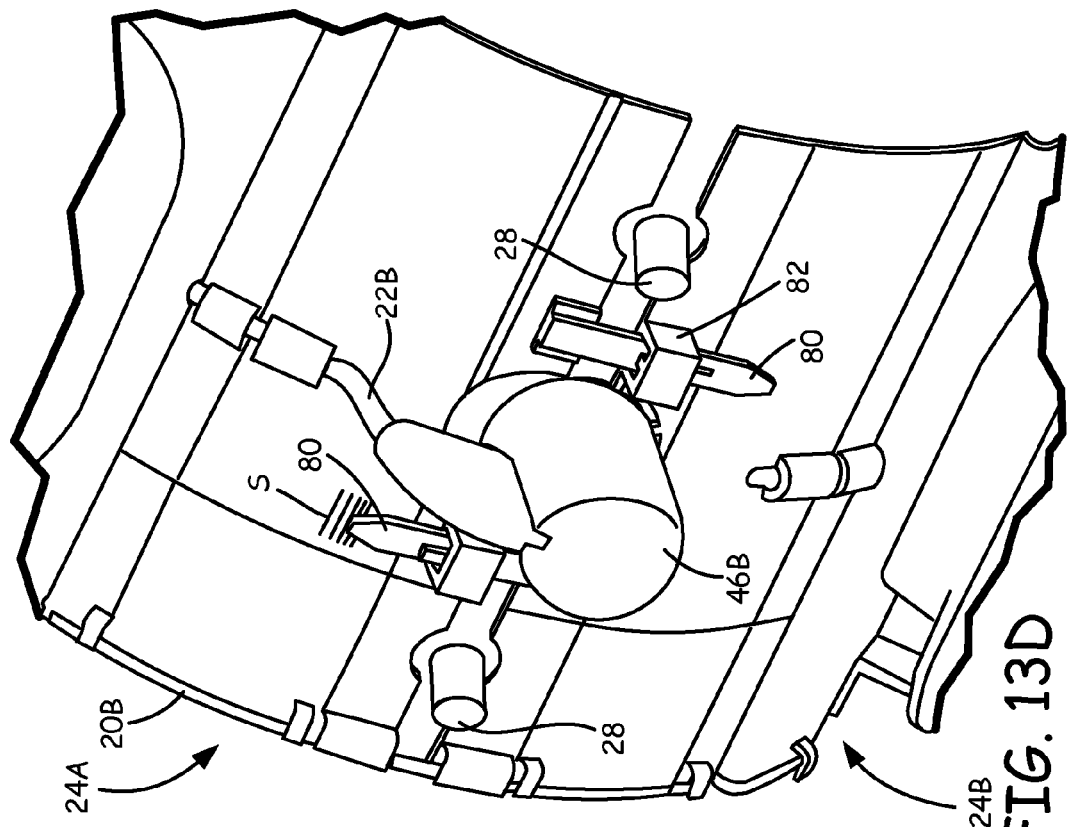
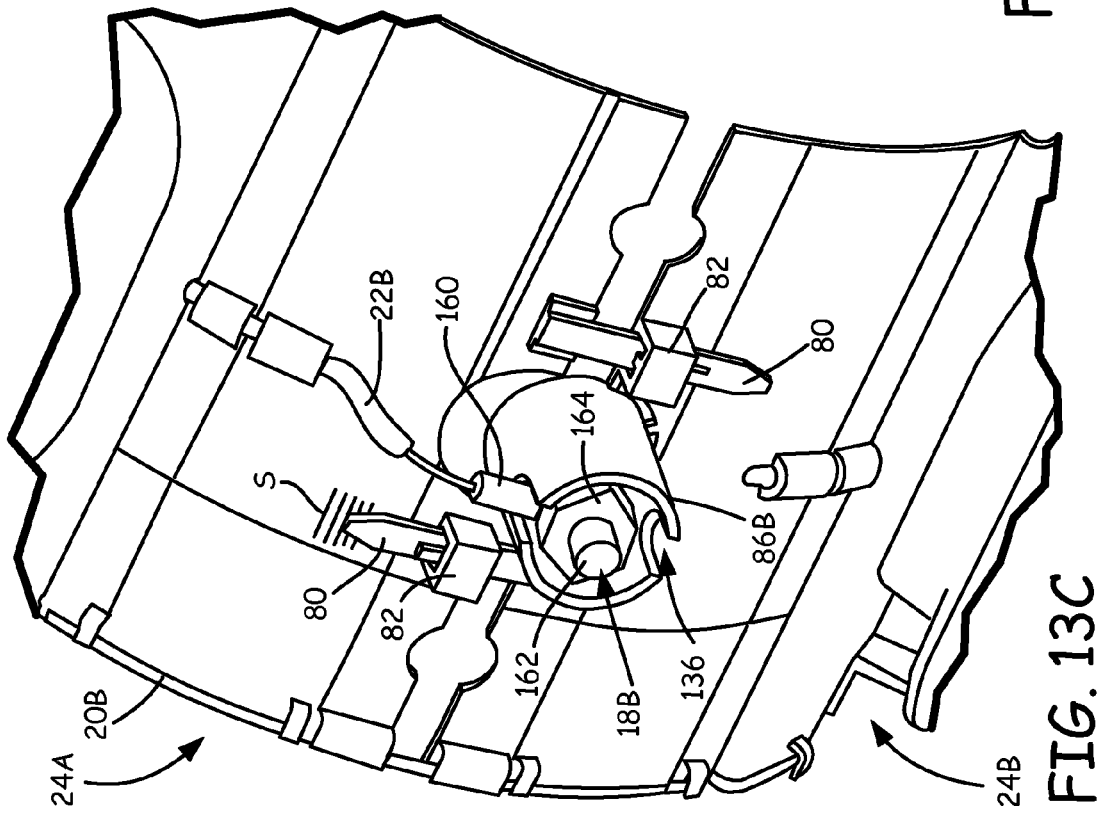

MAGNETIC FLOWMETER ASSEMBLY FRAMEWORK

BACKGROUND

This invention relates generally to fluid processing, and specifically to process flow measurement and control. In particular, the invention concerns magnetic flowmeters.

Magnetic flowmeters (or mag meters) measure flow by Faraday induction, an electromagnetic effect. The meter energizes a coil (or coils) to generate a magnetic field across a pipe section, and the magnetic field induces an electromotive force (EMF) across the process flow. The flow velocity is proportional to the induced EMF, and the volumetric flow rate is proportional to the flow velocity and flow area.

In general, electromagnetic flow measurement techniques are applicable to water-based fluids, ionic solutions and other conducting liquid flows. Specific uses include water treatment facilities, high-purity pharmaceutical manufacturing, hygienic food and beverage production, and chemical processing, including hazardous and corrosive process flows. Magnetic flowmeters are also employed in the hydrocarbon fuel industry, including hydraulic fracturing techniques utilizing abrasive and corrosive slurries, and in other hydrocarbon extraction and processing methods.

Magnetic flowmeters provide fast, accurate flow measurements in applications where differential pressure-based techniques are disfavored because of the associated pressure drop (for example, across an orifice plate or Venturi tube). Magnetic flowmeters can also be used when it is difficult or impractical to introduce into the process flow a mechanical element, such as turbine rotor, vortex-shedding element or Pitot tube.

A magnetic flowmeter determines a flow rate of a conductive fluid flowing through a conduit or pipe by measuring a voltage generated across the fluid in a direction perpendicular to the fluid flow as the fluid moves through a magnetic field generated by the flowmeter. The voltage is measured between two electrodes that are in contact with the fluid and are positioned on opposite sides of the pipe. The pipe walls must be either electrically non-conductive or, if conductive, have an electrically non-conductive liner to keep from shorting out the voltage generated across the fluid flow. If the pipe wall is conductive, the two electrodes must also be electrically insulated from the pipe wall and must penetrate the non-conductive liner to accurately measure the generated voltage.

Magnetic coils having a saddle shape, referred to simply as saddle coils, typically are utilized in magnetic flowmeters to generate the magnetic field. In a typical magnetic flowmeter, saddle coils are secured to opposite exterior portions of a cylindrical pipe, through which a fluid passes.

A typical saddle coil for a magnetic flowmeter is made by wrapping a coil winding about a permanent fixture in a flat (i.e., planar) orientation, then wrapping the winding with a tape or fiberglass material that covers top and bottom portions of the winding. Next, the winding is removed from the fixture and placed over part of a cylinder to bend it to a desired saddle shape. Then a coating on the winding is bonded together to harden the winding in the desired shape. Lastly, the winding assembly is secured to a mounting location on a pipe using conventional threaded mechanical fasteners (e.g., studs, bolts and clamps). Tape (or fiberglass) is utilized because an insulative coating on the wire of the winding is relatively thin, and during use the saddle coil may be exposed to vibrations and other conditions that can wear away the insulative coating and pose a risk of shorting the wire to the pipe on which it is installed. The tape also helps hold the wire of the winding together during bending and bonding operations. However, the tape and clamps utilized with prior art saddle coils are cumbersome during fabrication.

Assembly of magnetic flowmeters is labor intensive, complicated, and prone to variability and errors. Currently, very few of the parts used in the magnetic flowmeter are integrated or multifunction, which increases parts count, complicates assembly, and increases cost.

SUMMARY

A magnetic flowmeter comprises a pipe, coils for generating a magnetic field across the pipe, and electrodes for sensing electromotive force induced by process flow through the magnetic field. A framework is attached to the pipe, and the coils and electrodes, are located and secured in place by the framework.

BRIEF DESCRIPTION OF THE DRAWINGS

FIGS. 1A-1C are perspective views of a magnetic flowmeter in which an assembly framework surrounds the flowmeter pipe section and locates and supports the flowmeter components including electrodes, coils, wiring, and magnetic shields with respect to the pipe section.

FIGS. 3-15 illustrate assembly of magnetic flowmeter of FIGS. 1A-1C.

FIG. 3 shows one of two framework sections used in the magnetic flowmeter of FIGS. 1A-1C.

FIG. 4 illustrates initial joining of the two framework sections to form a framework.

FIGS. 5A and 5B illustrate how tabs of the framework sections snap around a winding coil.

FIGS. 6A and 6B illustrate routing a coil-to-coil wire in a channel on the framework sections and covering the coil-to-coil wire with tape, respectively.

FIGS. 7A and 7B illustrate connecting and covering a coil lead wire, respectively.

FIG. 8 shows the framework prior to installation on a pipe.

FIG. 9 shows a magnetic spreader mounted on an inner surface of the framework.

FIG. 12 shows a T stud and Belleville washer holding a coil winding cage in position on the pipe.

FIGS. 13A-13D illustrate mounting of an electrode in an electrode tunnel.

FIG. 15 illustrates attachment of a magnetic shield to the framework.

DETAILED DESCRIPTION

Figure 1B:
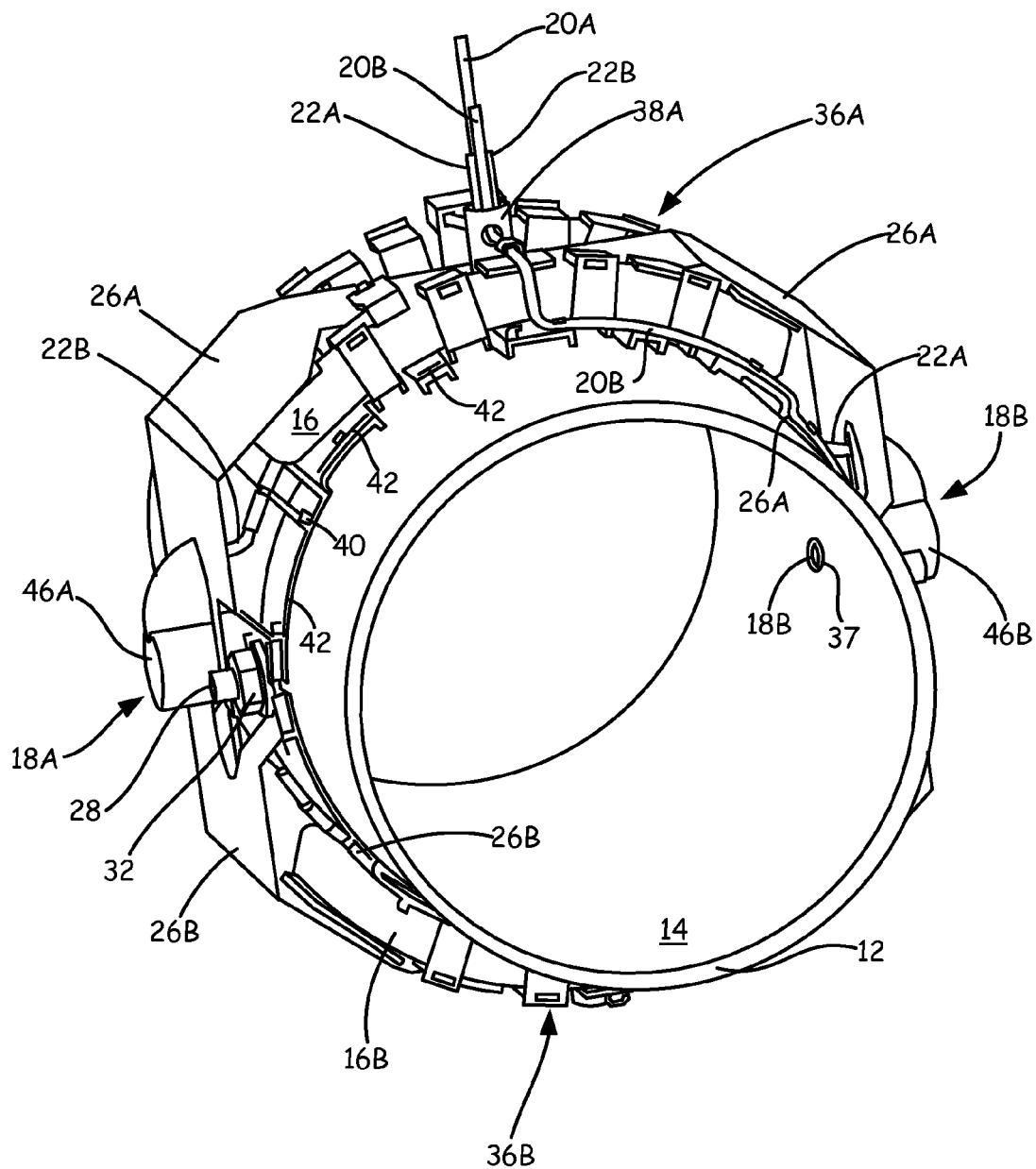
Figure 1C:
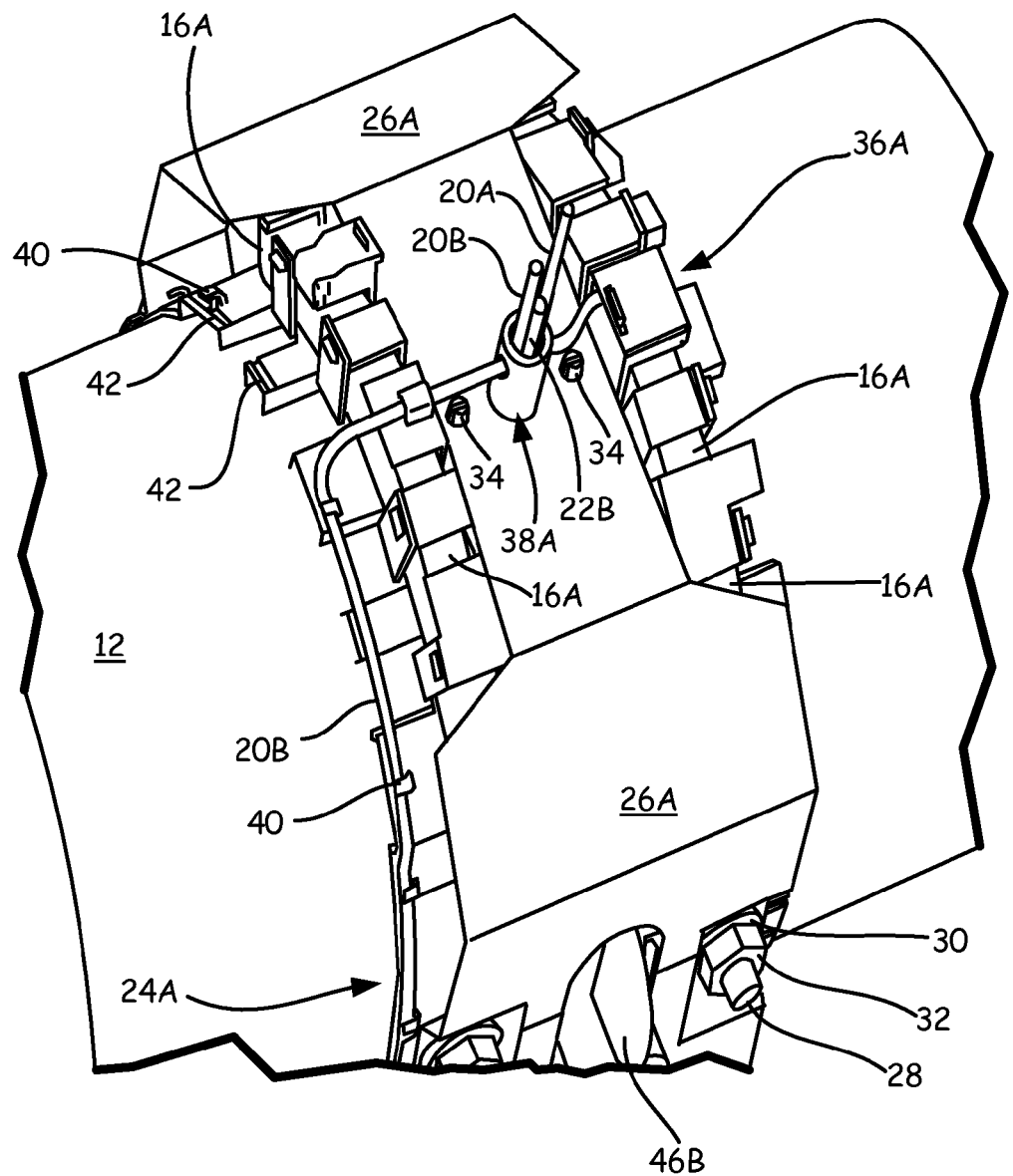

Pursuant to an embodiment of the invention, FIGS. 1A-1C are perspective views of magnetic flowmeter 10, which includes pipe 12, liner 14, magnetic coils 16A and 16B, electrodes 18A and 18B, coil lead wires 20A and 20B, electrode lead wires 22A and 22B, framework 24 (formed by framework sections 24A and 24B), and magnetic shields 26A and 26B. Liner 14 provides an electrically insulating surface on the inner wall of pipe 12. Framework 24 surrounds and is attached to pipe 12. Coils 16A and 16B, electrodes 18A and 18B, and the wiring associated with coils 16A, 16B, and electrodes 18A, 18B (including coil lead wires 20A, 20B, and electrode lead wires 22A, 22B) are located with respect to pipe 12 by framework 24. Framework 24 is held in place on pipe 12 by magnetic shields 26A, 26B, which are secured by studs 28, washers 30, and nuts 32. Magnetic shields 26A, 26B are also attached to framework 24 by snap features 34 that extend outward from framework 24. Magnetic shields 26A, 26B are made of high magnetic permeability material.

Each framework section 24A, 24B includes multiple segments that are hinged so that sections 24A and 24B can conform to the outer surface of pipe 12. Each half 24A, 24B includes cage 36A, 36B on which coil 16A, 16B is wound. Wire bundle tube 38A is located at the center of cage 36A and coil 16A. Coil lead wires 20A, 20B and electrode lead wires 22A, 22B extend out of wire bundle tube 38A. Framework sections 24A and 24B include flexible fingers 40 and grooves 42 along one edge to hold coil lead wire 20B in place as it extends from coil 16B to wire bundle tube 38A.

Coils 16A and 16B are positioned on opposite sides of pipe 12 and are located 180° apart. Coils 16A and 16B are wired in a series from coil lead wire 20A to coil 16A, from coil 16A through coil-to-coil wire 44 (shown in FIG. 2) to coil 16B, and from coil 16B to coil lead wire 20B. Coils 16A, 16B of are driven with electrical drive current to produce a magnetic field across the interior of pipe 12.

Electrodes 18A and 18B are also located 180° apart. Each electrode 18A, 18B is located 90° from the center of each coil 16A, 16B. Electrodes 18A, 18B extend through electrode holes 37 located 180° apart in the wall of tube 12, so that a distal end of each electrode is in contact with the fluid flowing through pipe 12. Span-on protective caps 46A, 46B cover the outer ends of electrodes 18A, 18B. Electrode lead wires 22A, 22B extend from under caps 46A, 46B across a portion of the outer surface of framework half 24A, and then along the inner surface of framework section 24A to wire bundle tube 38A.

The magnetic field produces an electromotive force (EMF) across the flow of process fluid through the pipe. The flow velocity is proportional to the induced EMF. Electrodes 18A and 18B sense the induced EMF and produce an electrical signal on electrode lead wires 22A and 22B. The volumetric flow rate of fluid flowing through pipe 12 is proportional to the flow velocity and the flow area of the interior of pipe 12.

Figure 2:
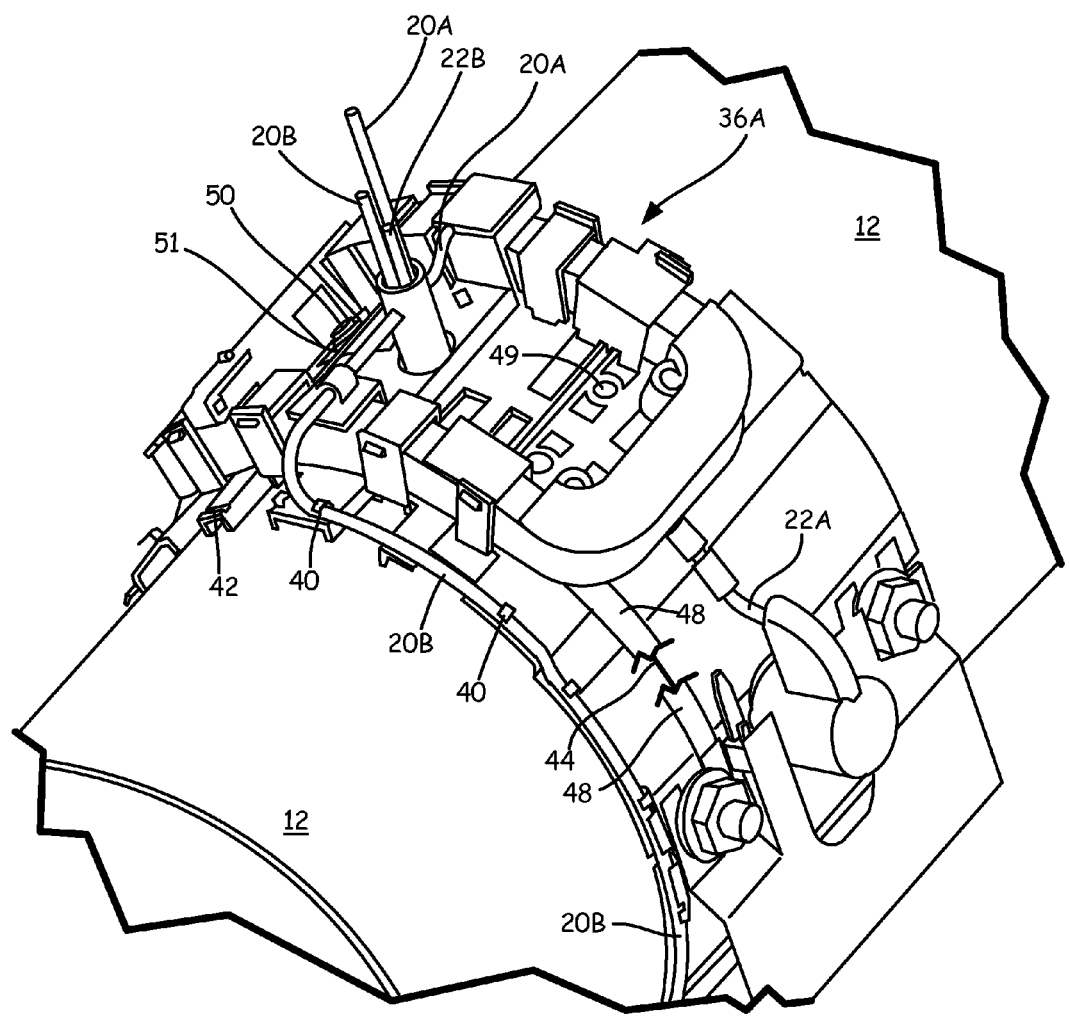
FIG. 2 shows the magnetic flowmeter of FIGS. 1A-1C with the top shield removed.

FIG. 2 shows magnetic flowmeter 10 with magnetic shield 26A removed. In FIG. 2, coil-to-coil wire 44 is shown. Wire 44 extends from coil 16A to coil 16B in a channel formed in the outer surface of framework halves 24A and 24B. Tape 48 covers coil-to-coil 44 as it extends from coil 16A to coil 16B. In FIG. 2, a portion of tape 48 is broken away so that coil-to-coil 44 can be seen.

In FIG. 2, holes 49, welded T stud 50 and Belleville washer 51 can be seen in the center portion of cage 36A. T stud 50 extends through one of holes 49. T stud 50 is welded to the outer surface of pipe 12 after framework 24 is in position. T stud 50 helps to prevent shifting of the position of framework 24 (and coils 16A and 16B) once framework 24 has been installed on pipe 12.

Typically, the voltages produced by a magnetic flowmeter are very low. As a result, the location of the saddle coils, electrodes, and wires with respect to one another can have a significant effect on magnetic flowmeter performance. With magnetic flowmeter 10, framework 24 defines the positional relationships of coils 16A and 16B, electrodes 18A and 18B, coil lead wires 20A and 20B, electrode lead wires 22B, and coil-to-coil wire 44. Channels are used so that wire locations are fixed, predictable, and consistent from product to product. With the use of wire bundle tube 38A, both electrode wires 22A and 22B exit magnetic flowmeter 10 through the center of coil 16A. Similarly, coil wires 20A and 20B pass through wire bundle tube 38A.

FIGS. 3-15 illustrate several embodiments of the assembly of magnetic flowmeter 10. The assembly process makes use of framework 26, which is mounted on pipe 10, and which coils 16A and 16B, electrodes 18A and 18B, and associated wiring are located and fixed in place.

Figure 3:
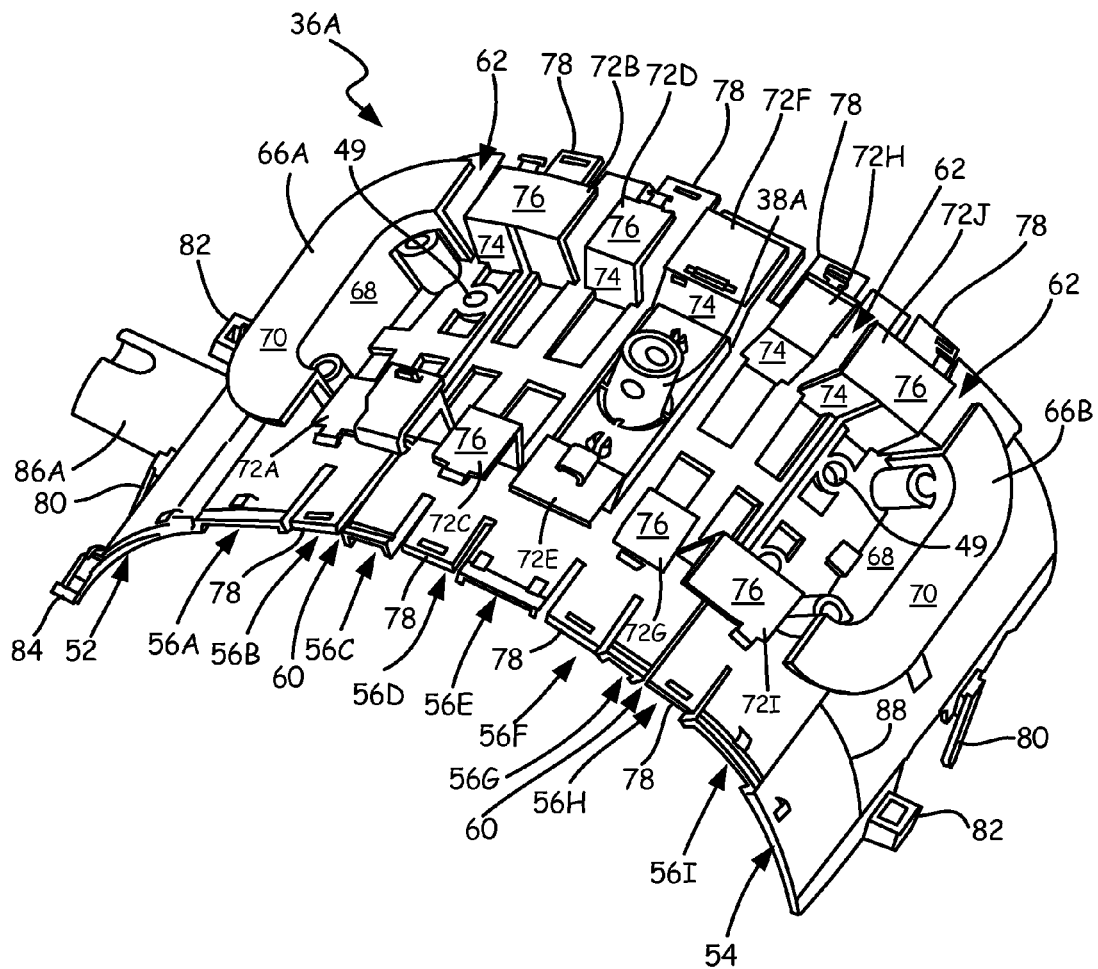

FIG. 3 shows framework section 24A, which in this embodiment is an injection molded structure formed of a polymeric material such as high temperature nylon. Sections 24A and 24B are preferably identical. This provides cost savings in injection molding tooling compared to a framework in which the sections are different. FIG. 3 illustrates section 24A without coil 16A is wound on cage 36A. Although section 24A is shown in a curved configuration in FIG. 3, it will be flattened rather than curved before and during winding of coil 16A, and then will be bent into the curved shape shown in FIG. 3. This allows coil 16A to be wound flat and then formed to a saddle coil arcuate shape.

Framework section 24A includes a series of segments, including end segments 52 and 54 and cage segments 56A-56I. End segment 52 of section 24A is configured to mate with end segment 54 of framework section 24B, and end segment 54 of section 24A is configured to mate with end segment 52 of framework section 24B. Cage segments 56A-56I define cage 36A, on which coil 16A will be wound.

In this embodiment, cage segments 56A-56I are capable of having a flat configuration when coil 16A is being wound, and then being formed into an arcuate shape (as shown in FIG. 3) to match the curvature of the outer wall of pipe 12. Cage 36A includes a plurality of kerf cuts ("kerfs") 60 and 62 (formed as part of the injection molding process) between adjacent cage segments to allow flexing of cage 36A from a flat to an arcuate shape. Kerfs 60 extend from the inner surface of framework section 24A outward, while kerfs cuts 62 extend from an outer surface of framework section 24A inward. When framework section 24A is formed into an arcuate configuration as shown in FIG. 3, kerfs 60 get narrower at the inner surface of framework section 24A, while kerfs 62 get wider at the outermost surfaces of section 24A. In other words, kerfs 62 expand from essentially a parallel slot to a V-shaped slot, while kerfs 60 contract from a V-shaped slot to a parallel sided slot as framework section 24A is bent into an arcuate shape as shown in FIG. 3.

Cage 36A includes coil forms that extend outward from cage segments 56A-56I to provide a form for winding coil 16A and for holding coil 16A after it has been wound. End turn coil forms 66A and 66B each include upstanding wall 68 and top flange 70. Side coil forms 72A-72C includes upstanding sections 74 and top flanges 76. Hinged tabs 78 on cage segments 56B, 56D, 56F, and 56H fold upward and connect with top flanges 76 to enclose coil 16A after it has been wound. FIG. 3 shows tabs 78 in their initial position before and during coil winding, i.e., before they have been folded up to engage top flanges 76.

At each end segment 52, 54 of framework section 24A, zip type connector elements are provided preferably, which will allow framework half 24A to connect to framework half 24B. The zip connector elements include ratchet tongue 80 and gear rack receptacle 82.

Also located at end segment 52 are stop elements 84, which are used to space apart sections 24A and 24B to produce a large enough gap so that sections 24A and 24B can slide over pipe 12 during installation of framework element 24 on pipe 12. Stop elements 84 can be broken off after framework 24 is positioned at the desired location on pipe 12 and electrodes 18A, 18B are aligned with electrode holes in pipe 12. Connector elements 80, 82 can then be used to tighten framework 24 around pipe 10.

One end of framework half 24A includes electrode tunnel 86A, which receives and holds electrode 18A. Connection of electrode wire 22A with electrode 18A occurs within tunnel 86A. Cap 46A (FIG. 1B) mounts over tunnel 86A and provides a protective cover over electrode 18A and the connection between electrode 18A and wire 22A.

Also shown in FIG. 3, is coil-to-coil wire channel 88. Channel 88 provides a defined path for coil-to-coil wire 44 as it extends from coil 16A in cage 36A of framework section 24A to coil 16B in cage 36B of framework section 24B.

Figure 4:
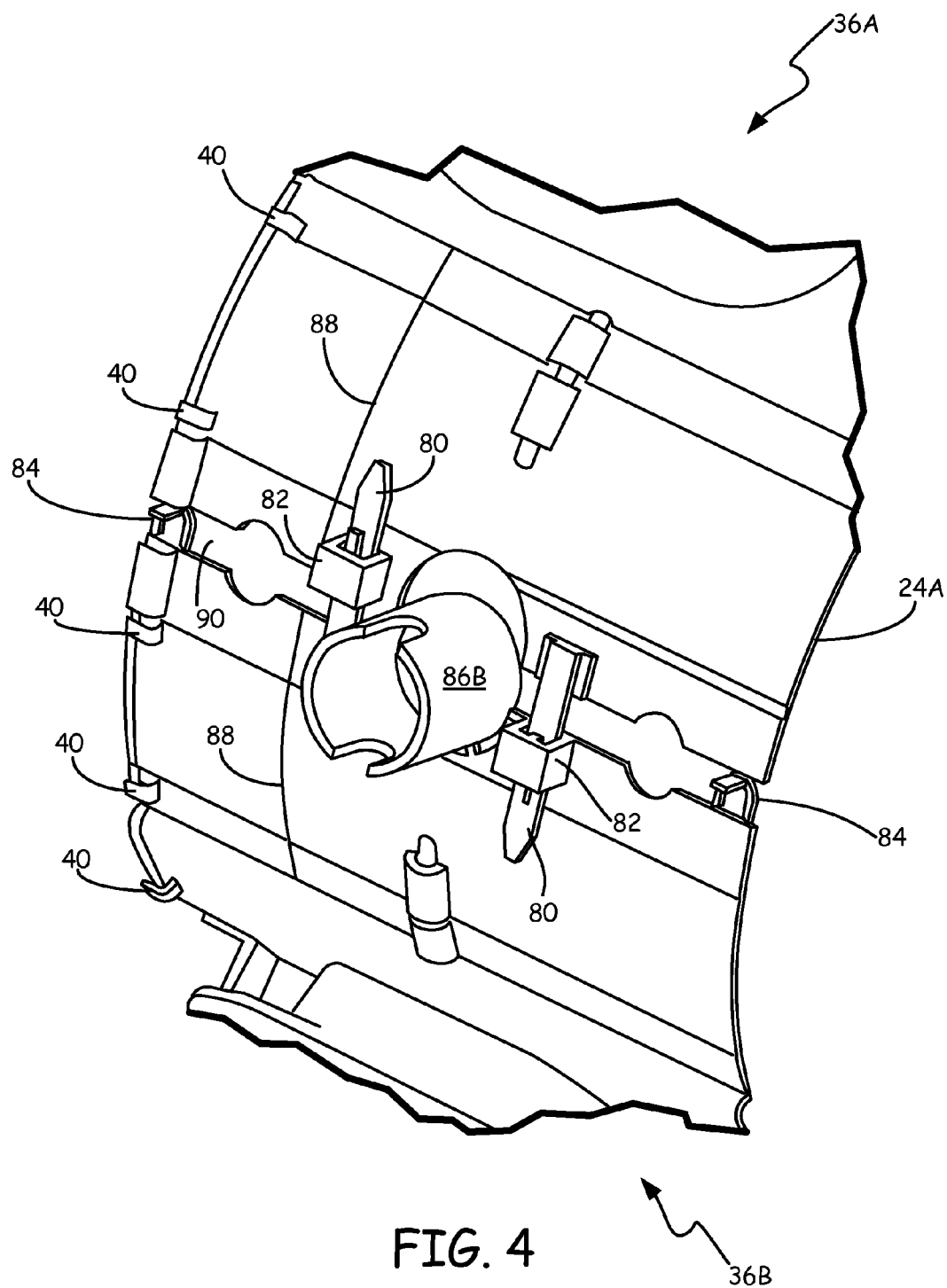

FIG. 4 illustrates initial joining of framework sections 24A and 24B. Tongue 80 of section 24B is inserted through receptacle 82 of section 24A. Similarly, tongue 80 of section 24A is inserted through receptacle 82 of section 24B. Tongues 80 and receptacles 82 provide a one-way ratchet mechanism (similar to cable ties) to hold sections 24A and 24B together. Spacer elements 84 extending from section 24B define a widened gap 90 between adjacent edges of sections 24A and 24B. Gap 90 will subsequently be closed to a smaller dimension after framework 24 is installed on pipe 12 and aligned with the electrode holes in pipe 12 that receive electrodes 18A and 18B. Stops 84 prevent over-insertion of tabs 80 through receptacles 82, and can be broken off later during final installation on pipe 12. Stops 84 can be set to space sections 24A and 24B so that framework 24 is large enough to fit over the maximum allowed outer diameter of pipe 12. It is appreciated that other structures and connectors may be used to join the two framework sections.

Once sections 24A and 24B are joined together, winding of coils 16A and 16B on cages 36A and 36B, respectively, begins. Coil 16A is wound first on cage 36A. During winding, cage segments 56A-56I are in a flat configuration. Coils 16A and 16B may be made from self-bonding magnet wire, for instance, a copper wire having an electrically insulative coating thereupon and a bondable coating arranged on the electrically insulative coating as a top coat. The bondable coating allows turns of the winding 16A, 16B to bond together to harden in a desired shape defined by cage 36A, 36B, respectively. The bondable coating is configured to be bondable under conditions where the electrically insulative coating is not. For example, the bondable coating can by an epoxy having a softening temperature (e.g., about 150-200° C.) that is lower than that of the electrically insulative coating. Alternatively, the bondable coating can be reflowable using a solvent or other material (e.g., copolymerization) in such a way that bonding of adjacent turns of winding 16A, 16B occurs while the underlying electrically insulative coating remains stable. Suitable self-bonding magnet wire is available from Superior-Essex, Atlanta, Ga.

FIGS. 5A and 5B show how tabs 78 snap around winding coil 16A. As shown in FIG. 5A, tabs 78 are connected to the main body of cage segment 56F and 56I by living hinges 90. Tabs 78 are shown in initial positions as formed by injection molding. Slot 92 is located near the outer edge of each tab 92. When tab 78 is folded upwards toward flange 76, slot 92 snaps over latch 94, which includes a ramp or tooth 96 for holding tab 78 in place against flange 76.

After coil 16A is wound and tabs 78 are folded and latched to flanges 76, the winding process continues with the winding of coil wire on cage 36B to form coil 16B. FIGS. 6A and 6B illustrate the routing of coil-to-coil wire 44 from coil 16A. Coil-to-coil wire 44 extends in channel 88 on the outer surface of framework sections 24A and 24B. As seen in FIG. 6A, wire 44 travels across gap 90 between sections 24A and 24B on its way to cage 36A where it will be wound onto cage 36B to form coil 16B. Channel 88 provides a consistent path for coil-to-coil wire 44 between coil 16A and 16B. Once wire 44 has been extended from coil 16A to cage 36B so that it can be wound onto cage 36B to form coil 16B, tape 48 is applied cover wire 44, as shown in FIG. 6B. In one embodiment, tape 48 is a fiberglass tape.

FIGS. 7A and 7B show the connection of coil wire 20A to wire 102 at an opposite end of the winding of coil 16A from coil-to-coil wire 44. Wire 102 and coil lead wire 20A are joined together within a cavity 104 formed by walls 105 on the top surface of flange 76 of coil form 72F. In the embodiment shown in FIG. 7A, wires 20A and 102 are looped and soldered together to make an electrical connection. In other embodiments, wires 20A and 102 may be connected by crimping. As shown in FIG. 7A, coil lead wire 20A is curved within cavity 104 to provide strain relief.

As shown in FIG. 7B, once a connection is made between wire 102 and coil lead wire 20A, cover 106 is positioned over platform 104 to enclose the connected ends of wires 102 and 20A. Cover 106 (which is not shown in FIG. 7A) can be hinged to flange 72 as shown in FIG. 7B.

Coil lead wire 20A enters wire bundle tube 38A through side port 108A. Coil lead wire 20A extends through wire bundle tube 38A and the outer end of tube 38A as shown in FIGS. 1A-1C, 2, and 8.

Figure 8:
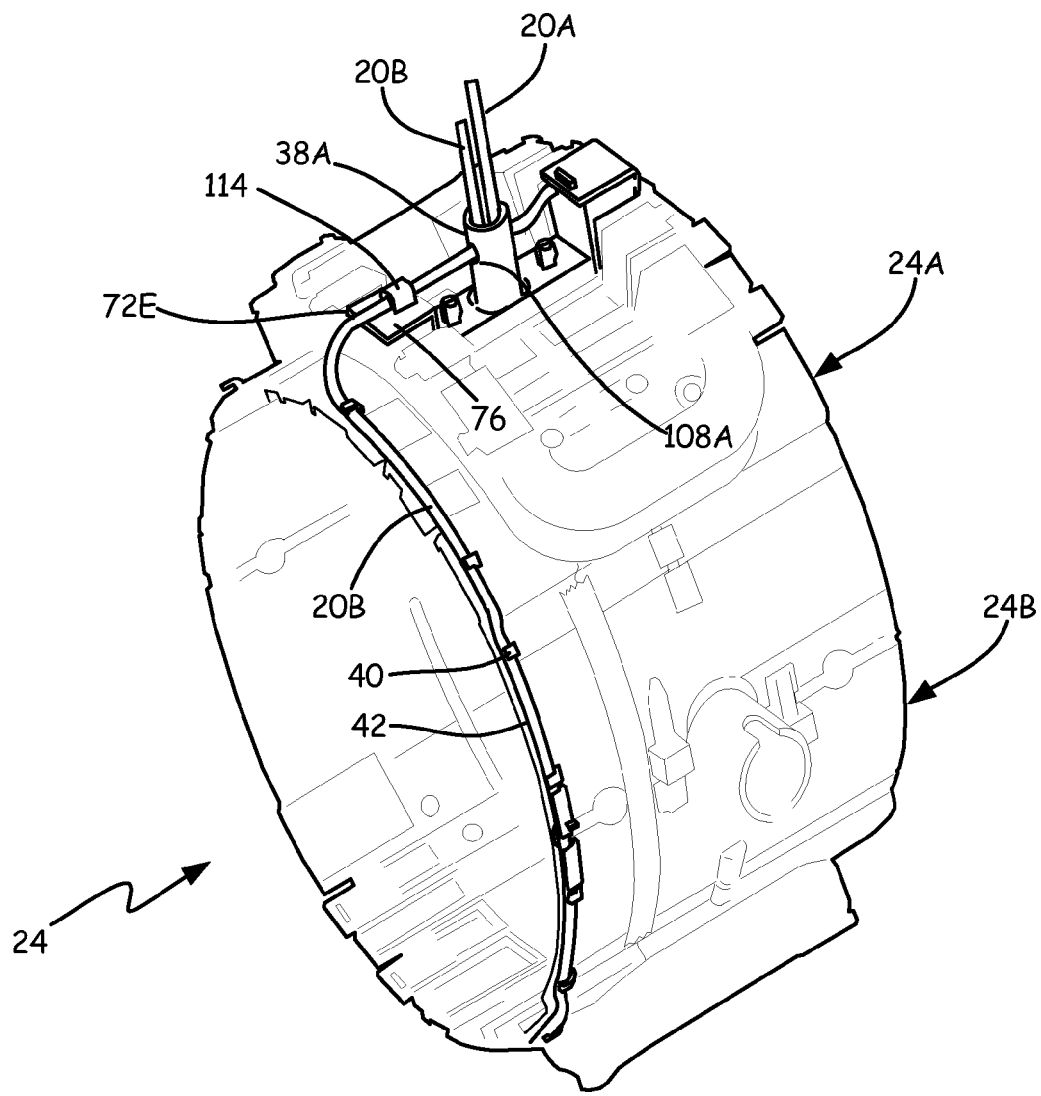

FIG. 8 shows framework 24 prior to installation of pipe 12. Coil wire 20B has been attached to coil 16B within a covered cavity on flange 76 of coil form 72A and cage 36B of section 24B. The connection is similar to the connection of coil wire 20A to coil 16A shown in FIGS. 7A-7B. Coil lead wire 20B extends along an edge of framework 24 to cage 36A and wire bundle tube 38A. Coil lead wire 20B extends along channel or grooves 42, and is held in place by flexible fingers or hooks 40. When coil lead wire 20B reaches cage 36A, it extends upward and over flange 76 of coil form 72E to side port 108A of wire bundle tube 38A. Coil lead wire 20B is held in position over flange 76 by flexible finger or hook 114.

Figure 9:
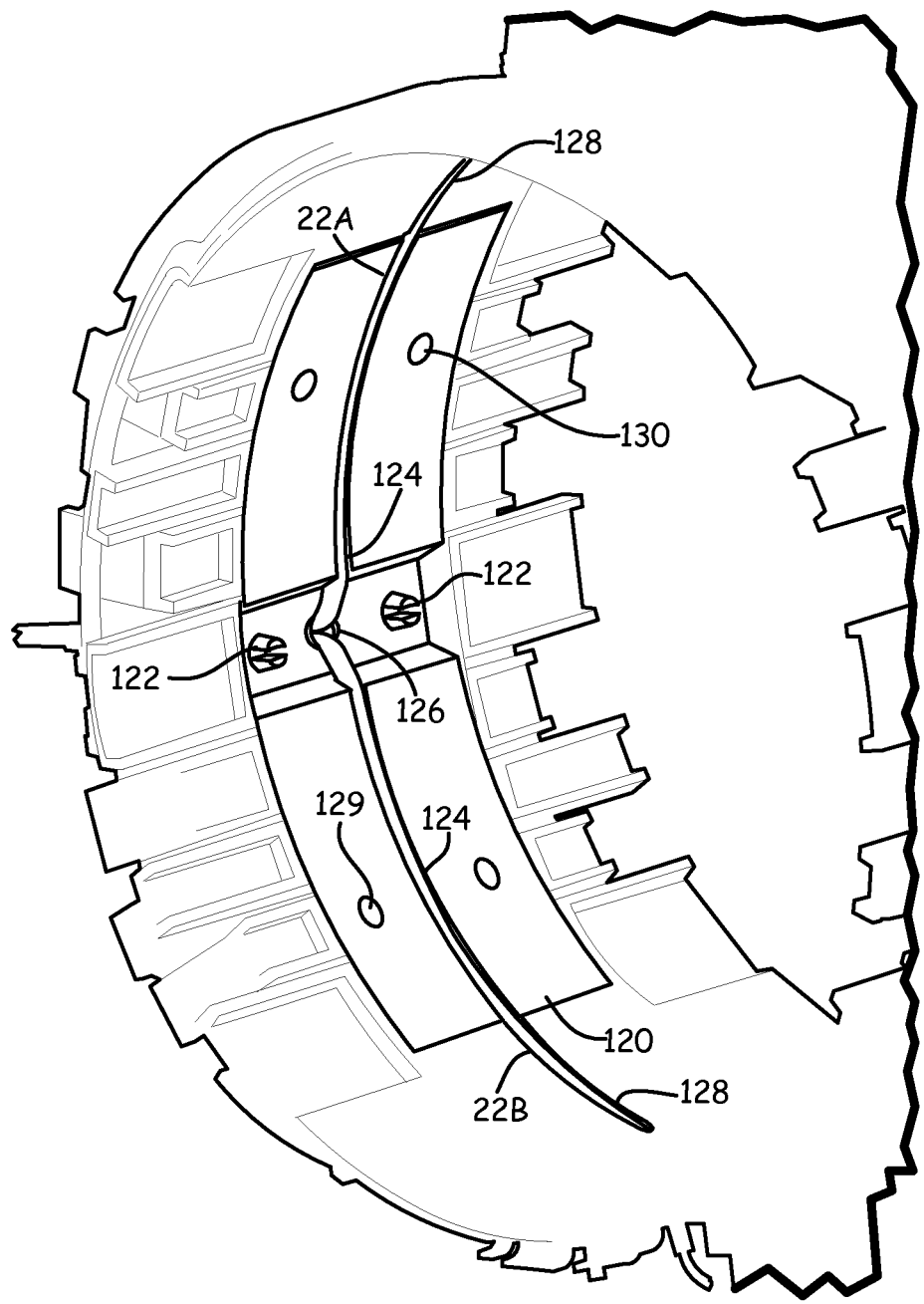

Once coil lead wire 20B had been routed, the next step is to route electrode lead wires 22A and 22B. Spreader or core piece 120 is mounted on the inner surface of framework section 24A. In FIG. 9, spreader 120 is preferably formed of transformer steel and is shaped to mate with the contours and is positioned underneath coil 16A to spread the magnetic field produced by the coils. Spreader 120 is held in place by snap features 122 that extend inwardly from framework section 24A.

Spreader 120 includes circumferentially extending channels 124 that extend outward from central hole 126. Channels 124 are aligned with channels 128 on the inner surface of framework section 24A. Each electrode lead wire 22A and 22B enters channel 128 and extends along channel 128 to channel 124 and then to hole 126. Central hole 126 is aligned with wire bundle tube 38A, so that electrode lead wires 22A and 22B pass through hole 126 and outward through wire bundle tube 38A. Also shown in FIG. 9 are mounting holes 129, through which T studs 50 are inserted (see FIG. 12).

In FIG. 9, only spreader 120 mounted to section 24A is seen. A similar spreader is mounted on the inner surface of framework section 24B. Spreaders 120 are arcuate, and help to shape sections 24A and 24B so that they conform to the outer surface of pipe 12.

Figure 10A:
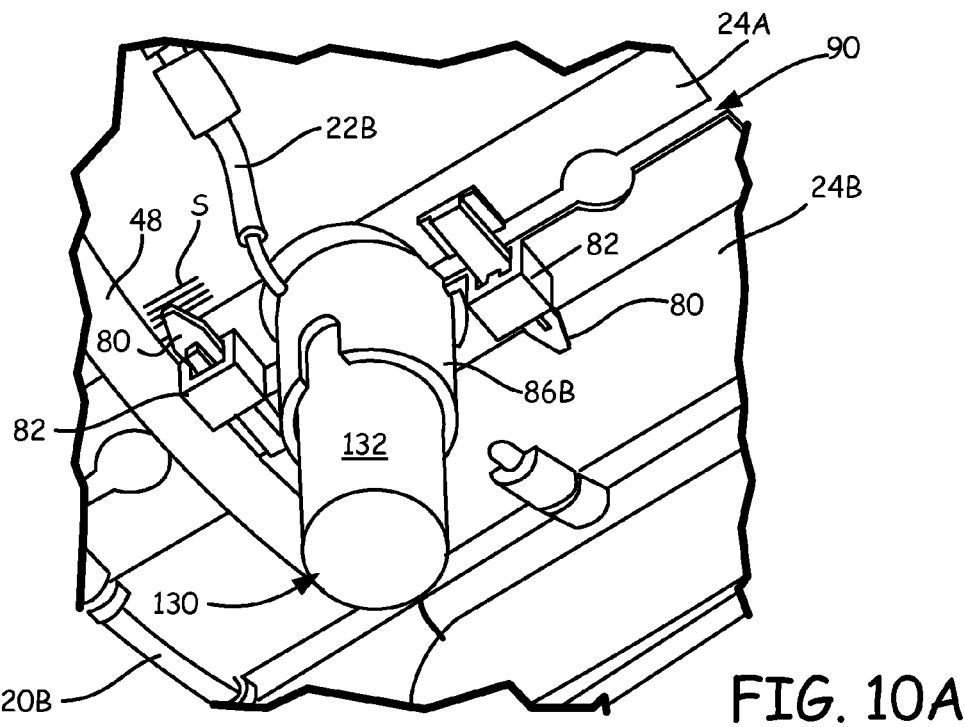
FIGS. 10A and 10B illustrate mounting the framework on the pipe so that electrode tunnels of the framework align with electrode holes in the pipe.
Figure 10B:
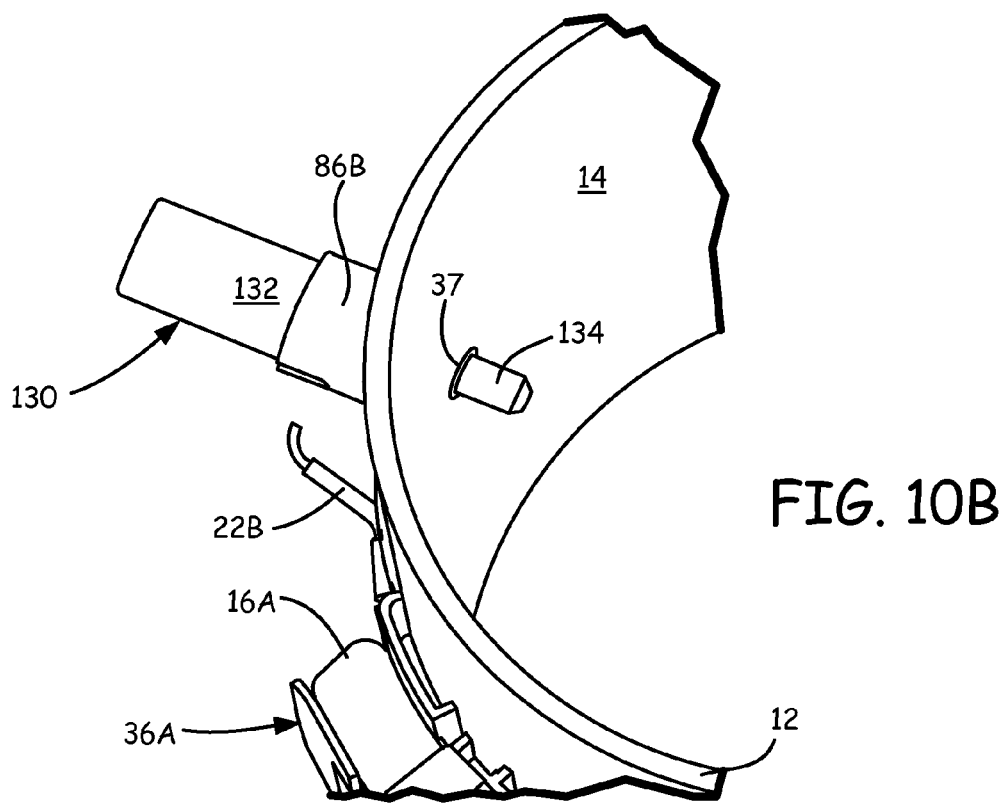

The next step in the assembly of this embodiment of magnetic flowmeter 10 involves mounting sections 24A and 24B on to pipe 12. Sections 24A and 24B are spaced apart by stops 84 so that framework 24 can slide on to pipe 12. Cages 86A and 86B must be aligned with their respective electrode holes 37 in pipe 12 so that electrodes 18A and 18B can be installed. Plastic pins 130 include proximal portion 132 sized to fit within tunnel 86A and distal portion 134 sized to fit in the electrode holes of pipe 12. In FIGS. 10A and 10B, the end of electrode lead wire 22B that will be connected to electrode 18B is shown.

Once framework 24 is in position with plastic pins 130 inserted into the electrode holes 37 in pipe 12, stops 84 (shown in FIG. 11A) are broken off. Sections 24A and 24B are then urged together to their final position surrounding pipe 12. Scale S on each section 24A, 24B is positioned with respect to gear rack receptacle 82 so that ratchet tongue 80 would be positioned over or near graduation lines of scale S. Scales S are positioned 180° apart and can be used to ensure that sections 24A and 24B are equally spaced at gaps 90.

Figure 11A:
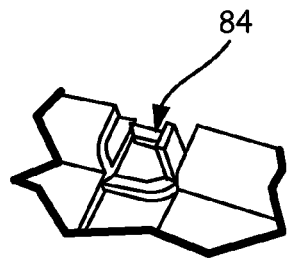
FIGS. 11A-11C illustrate final positioning of the framework sections using removable stops (FIG. 11A), a scale with graduation lines (FIG. 11B), and a cutout region for the coil-to-coil wire (FIG. 11C).
Figure 11B:
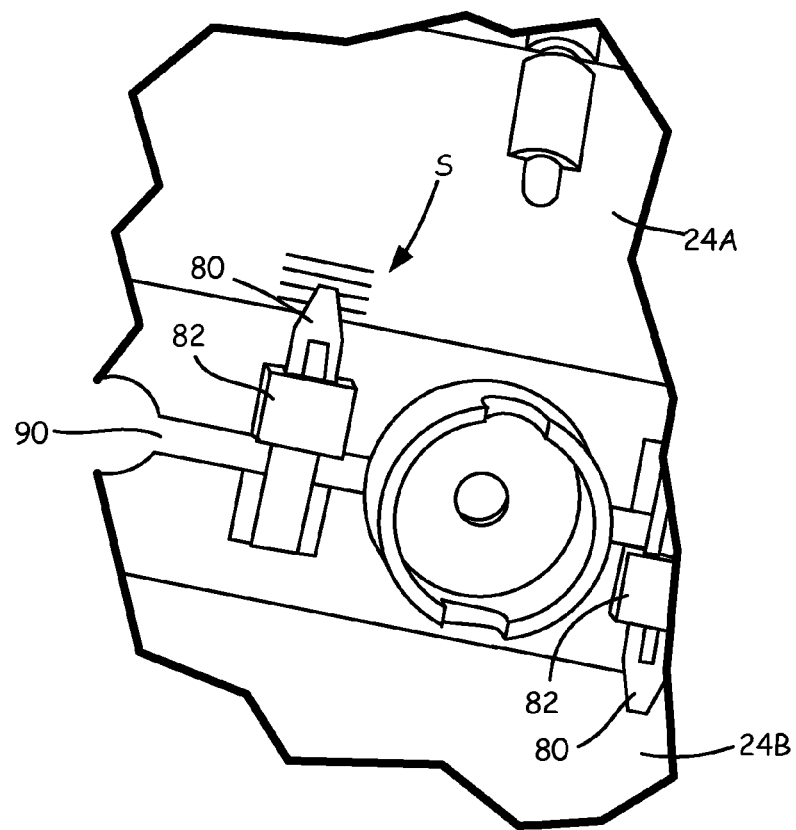
Figure 11C:
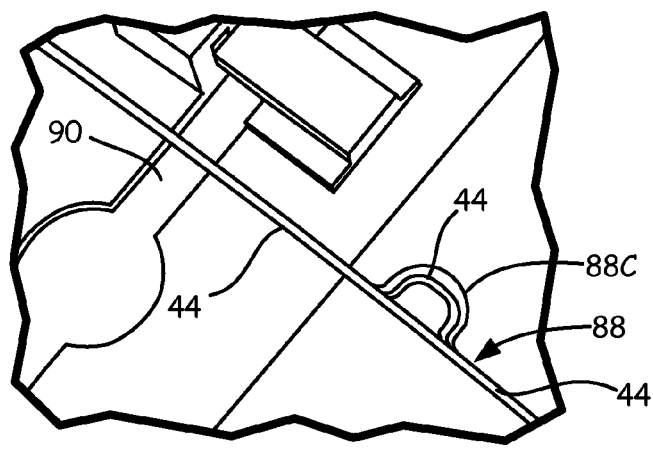

As shown in FIG. 11C, cutout region 88C of channel 88 allows coil-to-coil wire 44 can bend as sections 24A and 24B are brought together and gaps 90 close.

Figure 12:
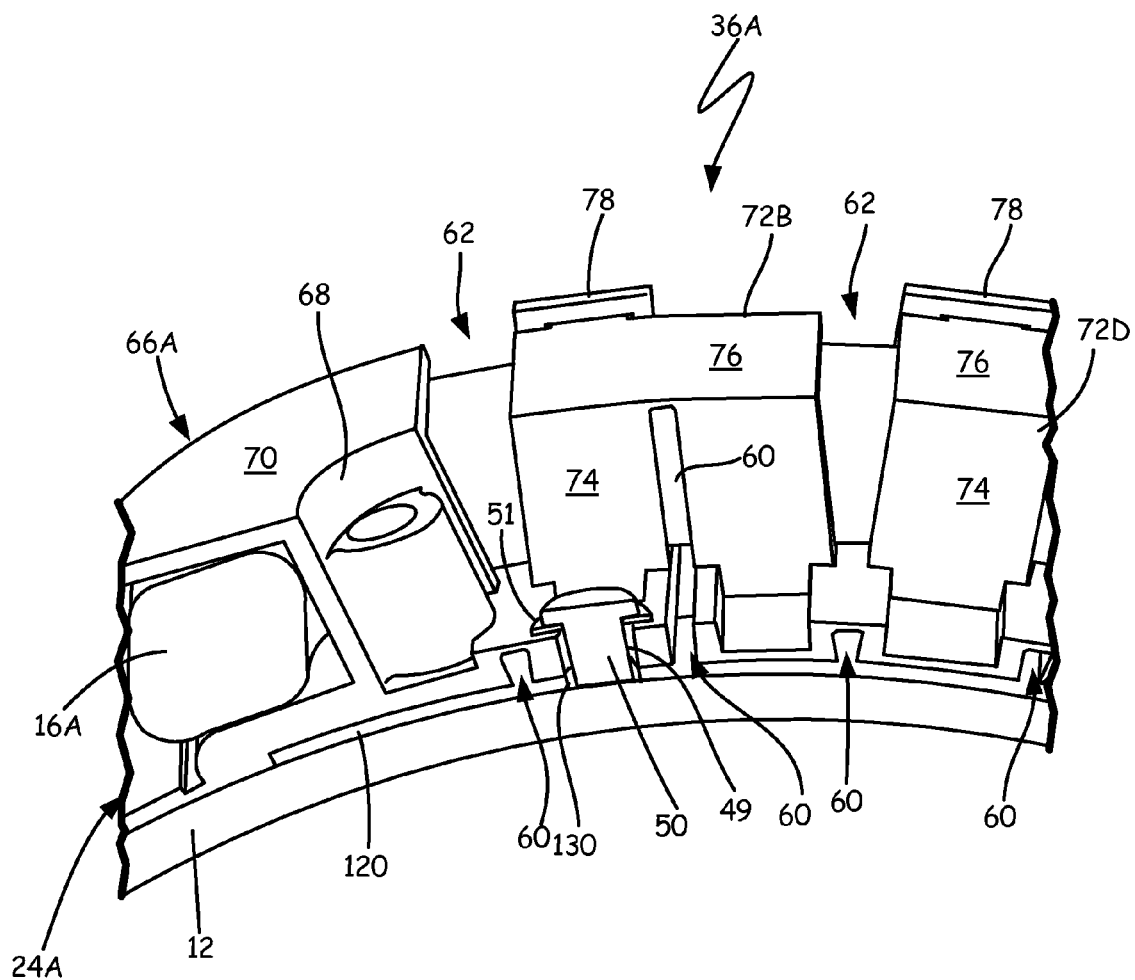

The center regions of coils 16A and 16B are secured with respect to pipe 12 using T studs 50. FIG. 12 shows T stud 50 and Bellville spring washer 51 holding cage 36A in position on pipe 12. T stud 50 extends through hole 49 in section 24A and hole 130 in spreader 120 to contact the outer wall of pipe 12. Alternatively, the center portions of cages 36A and 36B can be secured by threaded studs and nuts.

Figure 13A:
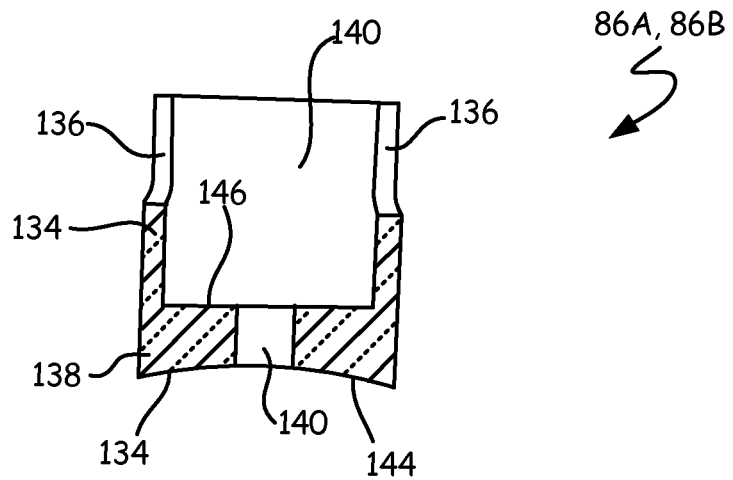

Next, electrodes 18A and 18B are installed in tunnels 86A and 86B. FIG. 13A is a sectional view of tunnel 86A, 86B, which has cylindrical side wall 134, slots 136, and bottom wall 138 with central bore 140. Sidewall 134 and bottom wall 138 define cavity 142 in which the proximal end of electrode 18A, 18B is positioned. Bottom wall 138 has curved bottom surface 144 that conforms to the pipe radius of the outer surface pipe 12. Surface 146 of bottom wall 138, which is at the inner end of cavity 140, is flat to provide a stable support for electrode 18A or 18B, or a spring or other retaining device associated with electrode 18A or 18B. As a result, electrodes 18A and 18B are aligned and oriented properly with respect to pipe 12, and it is not necessary to machine a flat onto the outer surface of pipe 12 or weld an auxiliary tunnel on to pipe 12 to ensure proper alignment and orientation, as well as no rocking movement, of electrodes 18A and 18B during use. Tunnels 86A and 86B, which are a part of sections 24A and 24B electrically insulate and stabilize electrodes 18A and 18B.

Figure 13B:
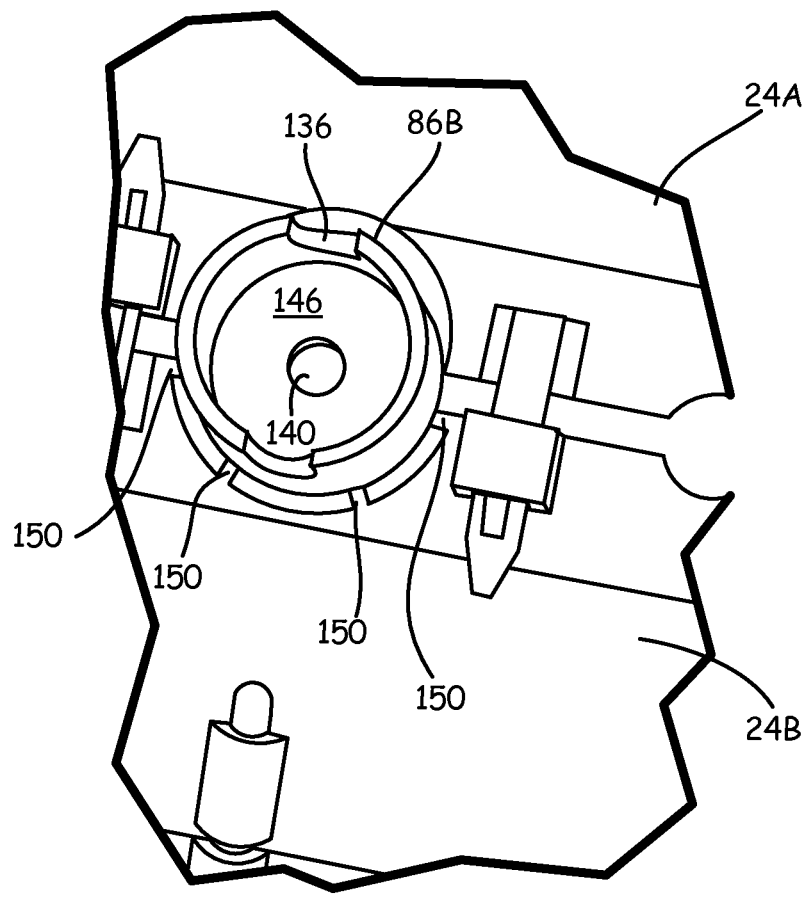

As shown in FIG. 13B, tunnel 86B is connected to framework section 24B by tear off spokes 150, and is not connected to adjacent section 24A. The tear off spokes 150 allow tunnel 86B to be removed for use with electrode styles that require a welded tunnel.

Plastic pins 130 are removed from tunnels 86A and 86B, and electrodes 18A and 18B are inserted in their place. FIG. 13C shows electrode 18B inserted in tunnel 86B. Electrode lead wire 22B has a ring terminal 160 on its end that is fitted over threaded end 162 of electrode 18B. Nut 164 is threaded onto electrode 18A and holds ring terminal 160 in place to make electrical connection between electrode 18B and electrode lead wire 22B. Ring terminal 160 is positioned in one of slots 136 in tunnel 86B so that ring terminal will not spin when nut 164 is being tightened.

As shown in FIG. 13D, snap on protective cap 46B fits over tunnel 86B and protects against shorting of electrode 18B. In FIG. 13D, threaded studs 28 have been welded to pipe 12, to secure the framework with the shields 26A and 26B at the completion of the assembly.

Figure 14A:
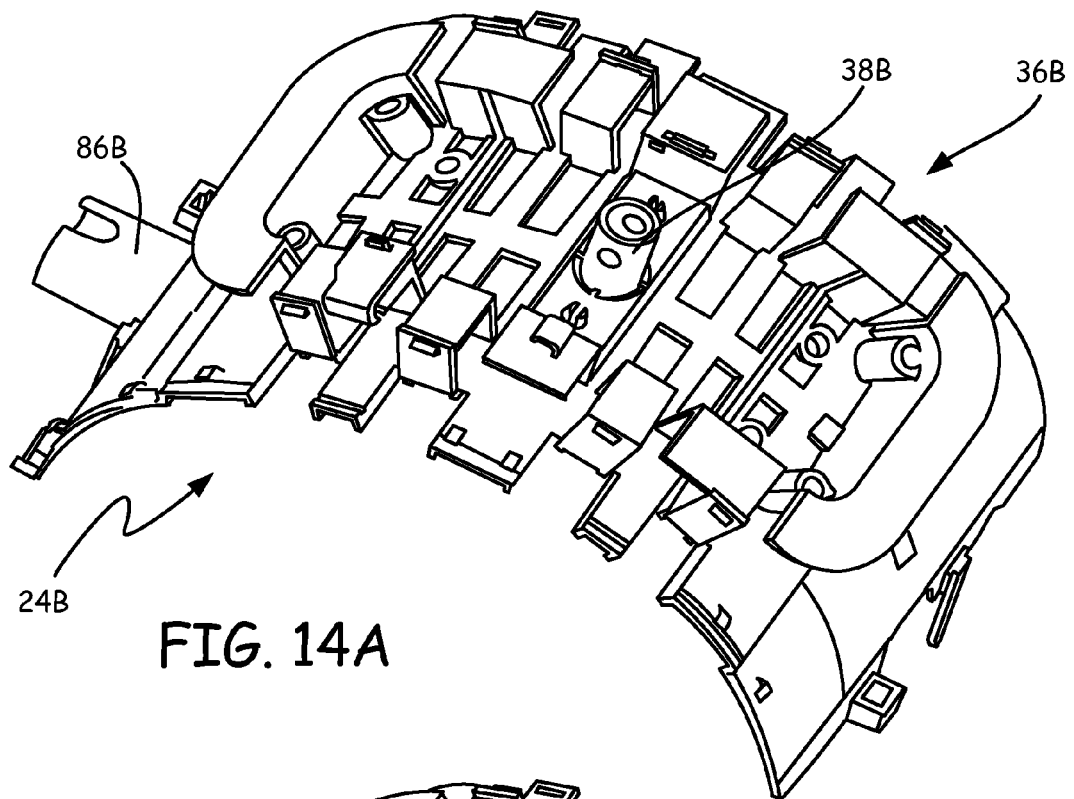
FIGS. 14A and 14B illustrate removal of an unused wire bundle tube to provide a location for a ground electrode connection to the pipe.
Figure 14B:
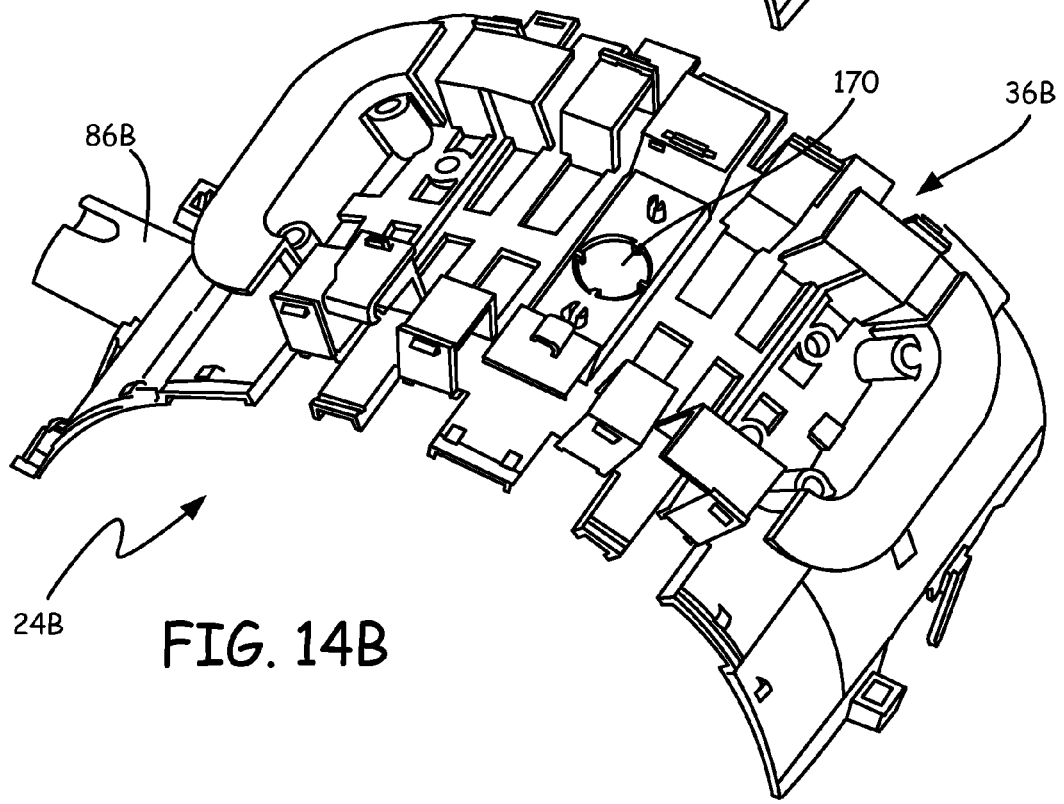

With sections 24A and 24B being identical, section 24B includes unnecessary wire bundle tube 38B, as shown in FIG. 14A. Because coil lead wires 20A, 20B and electrode lead wires 22A, 22B are all routed through wire bundle tube 38A, wire bundle tube 38B is unneeded. As shown in FIG. 14B, wire bundle tube 38B can be removed to provide hole 170 where a ground electrode (not shown) can make contact with the outer wall of pipe 12.

Figure 15:
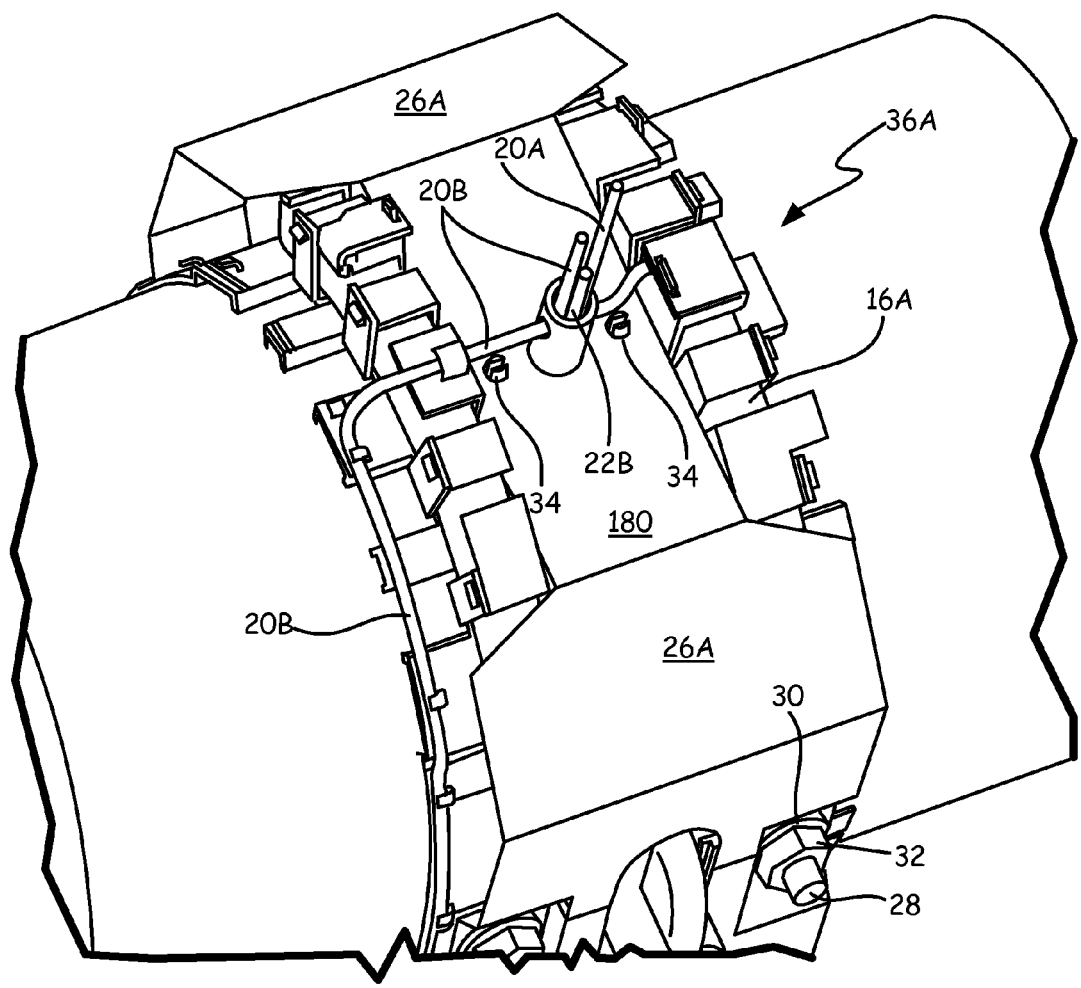

In the final assembly steps, magnetic shields 26A and 26B are mounted on framework 24. As shown in FIG. 15, shield 26A snaps on to cage 36A and is held in place by snap features 34. Magnetic shield 26A has narrowed yoke section 180 that fits within the center portion of cage 36A and is surrounded by coil 16A. Magnetic shield 26A is bolted down by threaded stud 28, washer 30 and nut 32, and therefore shield 26A serves a second purpose to secure framework 24 to pipe 12.

In the past, assembly of magnetic flowmeters has been labor intensive, complicated, and prone to variability and errors. Typically, very few of the parts of magnetic flowmeters are integrated or multifunction components, which increases parts count.

Framework 24 can be used to locate and secure all parts in magnetic flowmeter 10. This construction improves manufacturability and reduces total parts count. Manufacturing steps are reduced, and cost is saved by reducing the number of parts. Quality improvements also are achieved. Coil and electrode wiring is better protected against shorting. Positive location of all parts (including all of the wiring) with respect to framework 24 and one another, and thus pipe 12, reduces variability in magnetic flowmeter performance. Better performance is also achieved due to better alignment of electrode wires 22A, 22B in the magnetic field produced by magnetic coils 16A, 16B. The design of framework 24 allows it to be scaled up or scaled down in size in order to accommodate a wide range of different pipe diameters.

Although framework 24 was described as being formed by two identical sections 24A and 24B, other frameworks can have three or more sections, or can have a clamshell hinged construction, or can feature snap-together modular sections. Sections need not be identical. The sections can be joined by a variety of different techniques, including connectors, fasteners, adhesive, plastic solvent welding, and hot air welding.

A one piece framework that can be expanded for insertion over the pipe and shrunk to fit the pipe is also an alternative. A one-piece wrap around framework that is then clamped to the pipe is still another alternative.

Although a magnetic shield around the framework is shown as being formed by magnetic shields 26A and 26B, other embodiments can employ a single magnetic shield or three or more magnetic shields. Similarly, different embodiments may use one or more spreaders or core pieces mounted on framework 24.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A magnetic flowmeter comprising:
   a pipe;
   coils for generating a magnetic field across the pipe;
   electrodes for sensing electromotive force (EMF) induced by fluid flow through the magnetic field; and
   a flexible framework mounted on the pipe, wherein the framework locates and secures in place the coils and the electrodes with respect to the pipe, wherein the coils are mounted externally on the framework.

2. The magnetic flowmeter of claim 1, wherein the framework comprises a plurality of framework sections.

3. The magnetic flowmeter of claim 2, wherein the framework sections are joined together by ratchet and gear rack connections.

4. The magnetic flowmeter of claim 1, wherein the framework includes a first cage on which a first coil is wound and a second cage on which a second coil is wound.

5. The magnetic flowmeter of claim 4 and further comprising a magnetic shield over portions of the first cage and the second cage.

6. The magnetic flowmeter of claim 5, wherein the magnetic shield includes first and second magnetic shield portions that are connected to the first and second cages, respectively, by snap connectors.

7. A magnetic flowmeter comprising:
   a pipe;
   coils for generating a magnetic field across the pipe;
   electrodes for sensing electromotive force (EMF) induced by fluid flow through the magnetic field;
   a framework mounted on the pipe, wherein the framework locates and secures in place the coils and the electrodes with respect to the pipe and the framework includes a first cage on which a first coil is wound and a second cage on which a second coil is wound; and
   magnetic spreaders mounted on an inner surface of the framework.

8. A magnetic flowmeter comprising:
   a pipe;
   coils for generating a magnetic field across the pipe;
   electrodes for sensing electromotive force (EMF) induced by fluid flow through the magnetic field; and
   a framework mounted on the pipe, wherein the framework locates and secures in place the coils and the electrodes with respect to the pipe, the framework includes a first cage on which a first coil is wound and a second cage on which a second coil is wound, wherein the first and second cages include flexible tabs that are snapped in place to surround the coils.

9. A magnetic flowmeter comprising:
   a pipe;
   coils for generating a magnetic field across the pipe;
   electrodes for sensing electromotive force (EMF) induced by fluid flow through the magnetic field; and
   a framework mounted on the pipe, wherein the framework locates and secures in place the coils and the electrodes with respect to the pipe, wherein magnetic shields and magnetic spreaders are attached to the framework by snap connectors.

10. The magnetic flowmeter of claim 1, wherein the wiring associated with the coils and electrodes is positioned in channels in the framework.

11. The magnetic flowmeter of claim 1, wherein the framework includes a wire bundle tube located at a center of one of the coils and through which coil lead wires connected to the coils and electrode lead wires connected to the electrodes are routed.

12. The magnetic flowmeter of claim 1, wherein the framework includes tunnel receptacles into which the electrodes are installed.

13. The magnetic flowmeter of claim 12, wherein the tunnel receptacle has a curved bottom surface that conforms to an outer surface of the pipe.

14. The magnetic flowmeter of claim 13, wherein the tunnel receptacle includes a flat interior surface.

15. The magnetic flowmeter of claim 12, wherein the tunnel receptacle includes a slot for receiving a portion of a ring connector that makes electrical connection to the electrode.

16. A magnetic flowmeter comprising:
    a pipe;
    coils for generating a magnetic field across the pipe;
    electrodes for sensing electromotive force (EMF) induced by fluid flow through the magnetic field;
    a framework mounted on the pipe, wherein the framework locates and secures in place the coils and the electrodes with respect to the pipe and the framework includes tunnel receptacles into which the electrodes are installed; and
    covers that fit over the electrodes and the tunnel receptacles.

17. The magnetic flowmeter of claim 1, wherein the framework includes a plurality of inward extending kerfs and outward extending kerfs that allow the framework to be flattened during coil winding and then shaped to conform to the pipe.

18. The magnetic flowmeter of claim 1, wherein the framework includes a strain relief for a lead wire connected to one of the coils.

19. The magnetic flowmeter of claim 1, wherein the framework includes a covered compartment for a junction between a wire of one of the coils and a lead wire.

* * * * *